Oct. 25, 1949.  E. CAZA  2,485,862
PISTON RING
Filed Jan. 8, 1947
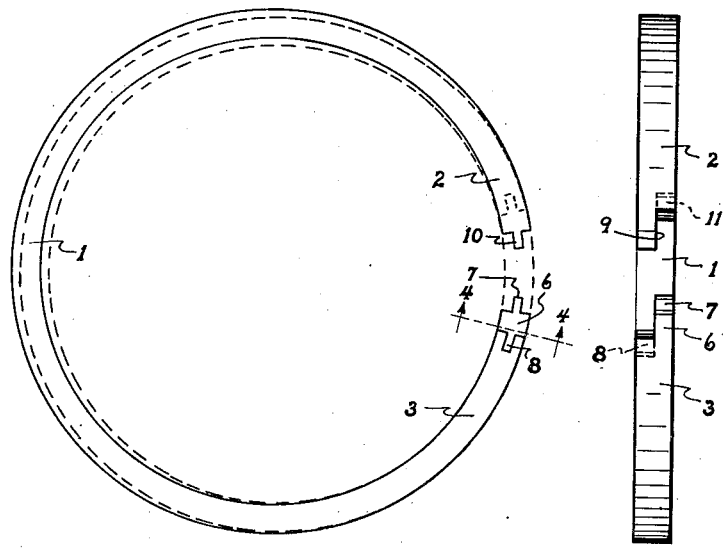
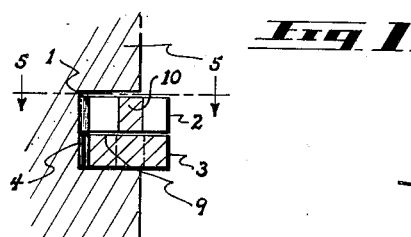
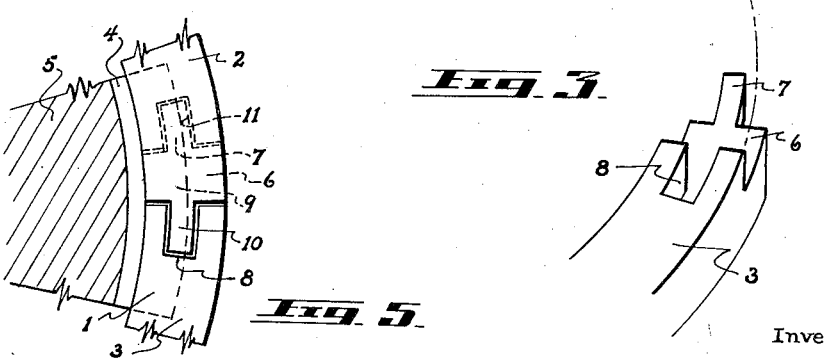
Inventor
EDGAR CAZA
by
Attorney Patented Oct. 25, 1949

2,485,862

UNITED STATES PATENT OFFICE 2,485,862

PISTON RING

Edgar Caza, Cornwall, Ontario, Canada

Application January 8, 1947, Serial No. 720,804

4 Claims. (Cl. 309—46)

This invention relates to improvements in a piston ring and appertains particularly to a packing ring of the conventional one-piece, divided type especially designed for the pistons of internal combustion engines and the like.

An object of the invention is to provide a packing ring intended for reception in the circumferential groove of a piston head having a pair of juxtaposed, slidably engaging, free ends of novel form.

A further object of the invention is to provide a one-piece, expansion type piston ring having interengaging ends constructed to resist the leakage of compressed gas from the explosion chamber and comprehending such novel form of interengaging ends as to prevent any escape of pressure radially across the joint, maintaining at all times a leak resistant barrier against blow-by gases passing back of the ring into the base of the piston head groove and from there out to the cylinder wall beneath the sealing ring.

A further object of the invention is to provide a leak-proof, expansion type piston ring whose slidably engaging ends are shaped to prevent any relative radial displacement of either one and to maintain a predetermined circumferential alignment.

A further object of the invention is to provide a piston ring with juxtaposed ends of novel configuration that interlock to prevent leakage radially across the joint and overlap horizontally to prevent, in conjunction with the confining upper and lower walls of the piston head groove, any relative vertical displacement of the ring ends or vertical leakage of the gaseous pressure through the joint.

A still further object of the invention is the provision of a leak-resistant, one-piece, piston ring of the nature and for the purpose described that is characterized by structural simplicity, operative efficiency and economy, durability, and low cost of manufacture, whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a plan view of a packing ring for a piston or the like constructed in accordance with my invention;

Figure 2 is an elevation thereof;

Figure 3 is an enlarged perspective view of the confronting and engageable ends of the ring in spread or open position;

Figure 4 is an enlarged fragmentary vertical section of a piston head showing my ring seated therein, the latter appearing as if sectioned along the line 4—4 of Figure 1; and Figure 5 is a corresponding fragmentary horizontal section as on line 5—5 of Figure 4.

The ring 1 is preferably formed of cast iron, rectangular in cross section, and of greater width than depth. The confronting ends 2 and 3 are sprung apart as shown in Figures 1, 2 and 3 and are compressed into interlocking and over-lapping sliding engagement when seated in the groove 4 of the piston head 5 and inserted within the confining cylinder of an engine, in which position they appear in Figures 4 and 5. When so closed, however, the ring must not be compressed to its minimum circumference as a prescribed tolerance must be allowed for expansion as the motor warms up or overheats to guard against the rings scoring the cylinder walls or seizing thereto.

The confronting, engageable ends 2 and 3 are complementary and of rather intricate form. The end 3 has its upper half cut away for the full width thereof and extending back for about $\frac{1}{8}$ or $\frac{5}{32}$ of an inch to provide a lower shelf 6 that for the outer half of its length is reduced to a central tongue 7, of one-third width. The upper half of the end 3 that rises above the shelf 6 is recessed as at 8 for the central one-third of its width and for a distance substantially equal to the length of the tongue 7.

The opposite end 2 is similarly configurated but in inverted relation, i. e., for the lower half of its thickness it is cut back to provide an upper protruding ledge 9, of the same length as the shelf 6 and terminating in a central tongue 10 machined to fit snugly in the recessed seat 8 in the cut back upper half of the end 3. Furthermore, the lower, cut back half of end 2 is recessed like the upper half of end 3 with a central backwardly extending seat 11 of one third the width of the ring in which the tongue 7 on the lower half shelf 6 of end 3 is designed to seat. These vertically overlapping, circumferentially offset, reversed pairs of interlocking male and female ends provide a piston ring joint with exceptional leak-resistance, especially in consequence of providing the circumferentially offset upper and lower tongues on opposite ends that are positioned centrally of the width of the ring and seat in correspondingly centrally disposed seats that likewise are circumferentially offset and in their respective vertical planes.

Where the ends of overlapping piston rings can displace radially by wear, warping or the like, it is impossible to prevent excessive blow-by since leakage is freely permitted into the groove behind the ring and back out again underneath. Since the tongues 7—10 and 8—11 in the instant design of ring occur in the central one-third of the ring's width, there is no possibility during the period of their engagement of the ring ends displacing radially or getting out of circumferential alignment; hence a continuous and thoroughly effective pressure seal is the result. The vertical dislodgement of the ends is of less consequence since this movement is confined by the upper and lower walls of the piston groove, so that the vertical stepping or shelving of the ends is of less importance in considering sealing against combustion chamber pressure loss than is the establishment of an adequate lateral barrier as the greater loss and more difficult to prevent occurs radially or across the ring, by-passing the packing through the base of the piston head groove.

From the foregoing description taken in connection with the accompanying drawings, it will be manifest that a piston ring is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new and desired to secure by Letters Patent is:

1. A piston ring of the one-piece, split, expansion type having a pair of engageable, vertically overlapping complementary ends, each cut back a considerable distance and for the full width of the ring, one end having its upper half cut away and the other end having its lower half cut away; each end having a tongue continuing from the extended half thereof and each end having a tongue-receiving recess continuing in from its cut back half.

2. A piston ring of the one-piece, split, expansion type having a pair of engageable, vertically overlapping complementary ends, each cut back a considerable distance and for the full width of the ring, one end having its upper half cut away and the other end having its lower half cut away; each end having a central tongue continuing from the extended half thereof and each end having a tongue-receiving recess continuing in from its cut back half, being disposed centrally of the width of the ring, and slidingly holding the tongue on the opposite end of the ring in circumferential alignment.

3. A piston ring having a pair of engageable complementary ends that are oppositely stepped vertically and lie in overlapping relation; said ends each being divided transversely in thirds with an extending tongue on the central third of the extended step and a tongue-receiving seat in the central third of the recessed step of each end; said tongue-provided extended step and said seat-including recessed step being in inverted relation in said respective ends.

4. As a new article of manufacture, a split, one-piece, packing ring for pistons and the like having a pair of normally sprung apart engageable ends, said ends being vertically stepped, overlapping and complementary, and circumferential aligning means on said ends comprising slidably engaging male and female parts on the respective vertical steps consisting of a tongue projecting from the forward side of the extended step and an accommodating seat continuing back from the recessed step; the tongue and seat, in each case, being approximately one-third the width of the ring and being disposed in the center, of a length approximating that of the remaining portion of the step and of the full height thereof.

EDGAR CAZA.

REFERENCES CITED

The following references are of record in the file of this patent:

UNITED STATES PATENTS

| Number | Name | Date |
|---|---|---|
| 1,353,082 | Stehle | Sept. 14, 1920 |
| 2,080,935 | Slyk | May 18, 1937 |

FOREIGN PATENTS

| Number | Country | Date |
|---|---|---|
| 805,352 | France | Nov. 18, 1936 |